Aug. 15, 1944.   A. W. DELUCCHI ET AL   2,355,708
MERCHANDISE CONVEYING SYSTEM FOR SELF-HELP STORES
Filed June 21, 1943   2 Sheets-Sheet 1
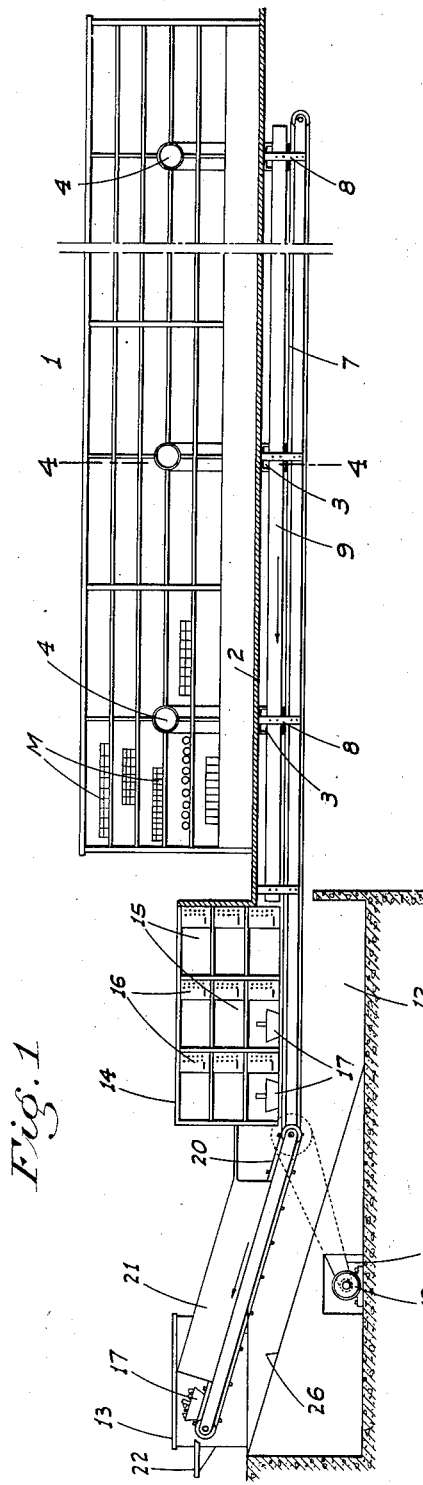
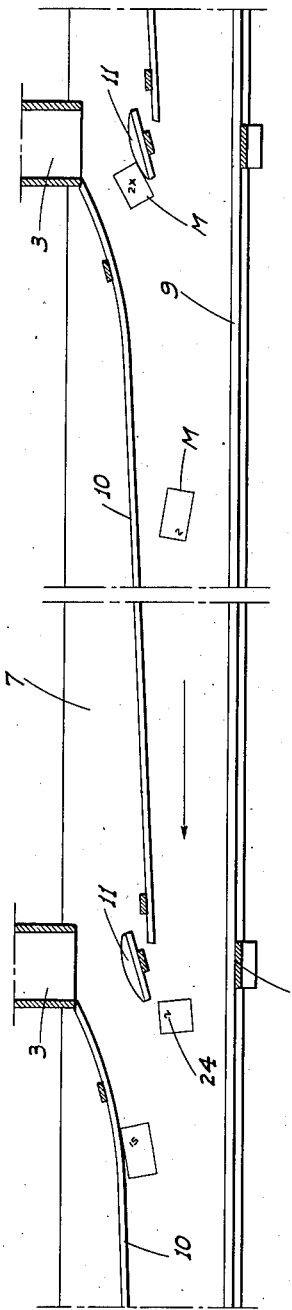
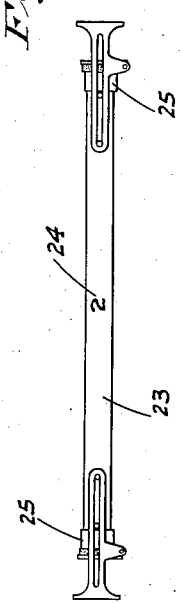
Inventors
A. W. Delucchi
H. A. Stagnaro
By
Webster & Webster
Attorney Aug. 15, 1944.  A. W. DELUCCHI ET AL  2,355,708
MERCHANDISE CONVEYING SYSTEM FOR SELF-HELP STORES
Filed June 21, 1943  2 Sheets-Sheet 2

Inventors
A. W. Delucchi
H. A. Stagnaro

Patented Aug. 15, 1944

2,355,708

UNITED STATES PATENT OFFICE 2,355,708

MERCHANDISE CONVEYING SYSTEM FOR SELF-HELP STORES

Anthony W. Delucchi and Henry A. Stagnaro, Stockton, Calif.

Application June 21, 1943, Serial No. 491,620

3 Claims. (Cl. 186—1)

This invention relates generally to improvements in self-help stores, and in particular the invention has for its principal object the provision of a novel merchandise conveying and price computing system for stores of this type; such system being arranged so that the customer's selections from the merchandise shelves are conveyed from adjacent the point of selection to the cashier's counter by means disposed clear of the shopping area of the store, the price of such selected merchandise being computed and indicated by a price tag placed with the merchandise prior to delivery of the latter to the customer at said cashier's counter. By virtue of the above system, the customer does not have to carry selected merchandise about the store with attendant effort and tendency to create confusion and congestion, and in addition shopping is materially expedited and delay avoided.

A further object of this invention is to provide a merchandise conveying and price computing system as above, in which each article of merchandise, as selected by the customer, is distinctively marked by him and then deposited in a conveniently located chute. From these chutes the merchandise is conveyed mechanically by an under-floor conveyor to a sorting station where such merchandise is sorted, accumulated into groups corresponding to each customer's mark, and the price of the merchandise in each group computed and evidenced by a price tag disposed with the group; such groups then being conveyed to the cashier's counter for delivery to the customer upon payment of the computed price.

An additional object of the invention is to provide a system, as in the preceding paragraph, in which the customer is provided with means to place a distinctive mark on each article of selected merchandise and which means is also arranged to place a further mark upon the last article of merchandise purchased in order to indicate to the sorter at the sorting station that such purchaser has completed his shopping and is ready for delivery at the cashier's counter of the corresponding group of merchandise.

A still further object of the invention is to provide a merchandise conveying and computing system, as described, which includes a unique arrangement of merchandise group-receiving containers and tabulators at the sorting station.

These objects we accomplish by means of such structure and relative arrangement of parts as will fully appear by a perusal of the following specification.

In the drawings similar characters of reference indicate corresponding parts in the several views:

Figure 1 is a diagrammatic elevation of the system as employed in connection with a single row of store shelves.

Figure 2 is an enlarged fragmentary sectional plan of the under-floor conveyor.

Figure 3 is a view of the marking device employed by each customer.

Figure 4:
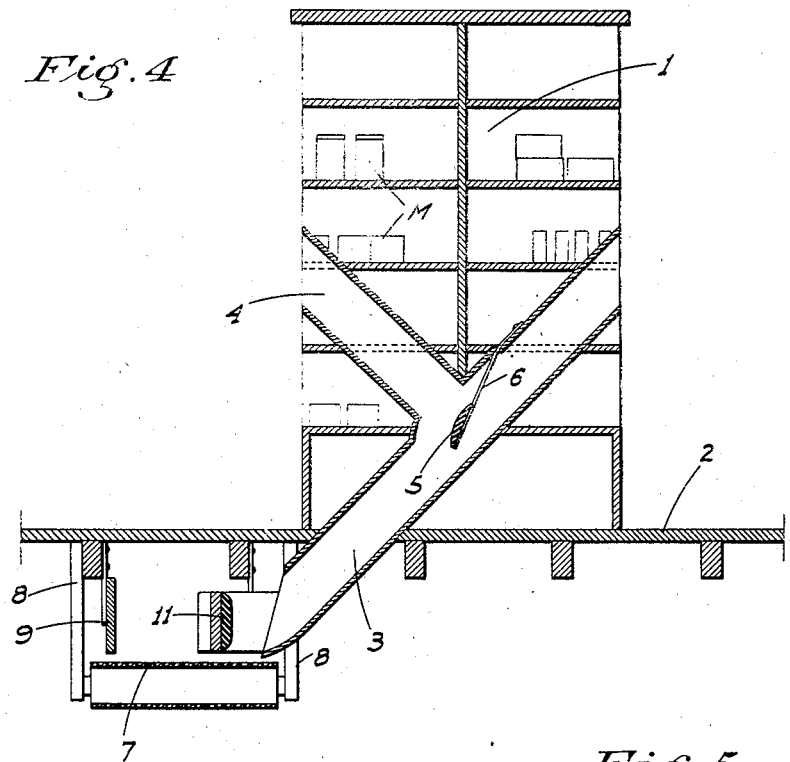
Figure 4 is an enlarged cross section on line 4—4 of Fig. 1.

Referring now more particularly to the characters of reference on the drawings, and particularly at present to Figs. 1 to 4 inclusive, the numeral 1 indicates a row of shelves supported by and upstanding from the floor 2 of the store; the row being open at both sides. Downwardly inclined chutes 3 extend from one face of the shelf row 1 in longitudinally spaced relation and from a point intermediate the top and bottom of said row, said chutes extending through the floor 2 and terminating a short distance therebelow. When the shelves are double faced, as shown, i. e. open on both sides, the chute 3 is formed with a branch 4 which extends at right angles to said chute and opens to the opposite face of the row at a corresponding point. When the chute 3 is branched as described, a shock absorbing and deflector pad 5 is mounted in the chute 3 immediately adjacent the inner end of the branch 4 by suitable means, as for instance a spring arm 6 which extends into the chute 3 at such a downward angle as to permit of passage of articles of merchandise M placed in the upper end of said chute 3. Articles of merchandise placed in the branch 4 will slide down said branch, strike the shock absorber pad 5 and be deflected into chute 3.

The chutes 3 deliver at their lower ends onto an endless horizontal conveyor 7 suspended directly beneath the floor 2 by suitable means indicated generally at 8. The conveyor 7 includes an upstanding retaining board or wall 9 which extends longitudinally above the upper reach of said conveyor on the side opposite the chutes 3. Other retaining and deflecting boards or walls 10 extend longitudinally from each chute in overhanging relation to the upper reach conveyor to a termination substantially at the center line of the conveyor and adjacent the next chute 3 in the direction of travel. Shock absorbing and deflector bumpers 11 are mounted above the conveyor 7 at the lower end of each chute 3, such bumpers 11 being disposed to also serve as deflectors, whereby articles of merchandise sliding down the chutes engage the bumpers and are thence diverted onto the conveyor 7. The deflector boards 10 cause the articles of merchandise to be shifted toward the side of the conveyor remote from the chutes so that merchandise falling from subsequent chutes will fall clear of merchandise already on the conveyor.

Adjacent its discharge end the conveyor 7 runs into a pit or recess 12 formed in the floor of the store adjacent the cashier's counter 13, and this pit serves as a sorting station. A pigeon-hole like rack 14 is mounted alongside the conveyor 7 in the pit 12, each opening 15 of such rack being of substantial size and provided with a computing machine 16. A merchandise container such as a basket 17 is adapted to be placed in each opening 15 of the rack.

The conveyor 7 is driven by any suitable means, such as an electric motor 18 and an endless belt drive 19.

Another endless conveyor 20, whose upper reach is covered for substantially its full length by a hood 21, extends from adjacent the rack 14 at an upward incline to a receiving platform 22 adjacent the cashier's counter 13; this conveyor likewise being driven from motor 18.

In operation, the above described system functions as follows:

When the customer enters the store he is placed in possession of a marking device, indicated generally at 23, upon which an identification numeral or the like appears, as at 24; such marking device being a self-inking type stamp and including a stamp head 25 at each end. One of said stamp heads is formed to make a mark corresponding to the numeral indicated at 24, whereas the other stamp head is formed to make another and additional mark, as for example the letter X, as shown in Fig. 2.

As the customer moves through the store and selects articles of merchandise he stamps each with the stamp head 25 corresponding to the numeral indicated at 24, here shown as the numeral 2, and thereafter places the marked articles in the most convenient chute 3, whence the articles fall onto the conveyor 7 and are carried to the sorting station in the pit 12. The sorter in such pit sorts the articles according to the numeral marked thereon and places all articles of like number in a container 17 in the rack 14 corresponding to such numeral, and at the same time "rings up" the price of such article on the computing machine 16 in the same opening 15 as such container.

When the customer selects the last item which he is going to purchase, he impresses the mark made by the other stamp head, here shown a 2X. When the sorter receives such last article of merchandise with the X stamped thereon he is thus apprised of the fact that this particular customer has completed his shopping. When this occurs the sorter completes the price computation on the corresponding computing machine and places the price tag in the proper basket 17. The basket is then removed from the rack 14 and placed upon the conveyor 20, which delivers it to the platform 22 at the cashier's counter 13 to await delivery to the customer upon payment of the computed price as evidenced by the accompanying price tag, and return of the marking device 23.

In certain cases, the cashier may wish to assist or relieve the sorter. To this end, a ramp 26 leads into pit 19 from the floor 2 adjacent the cashier's desk so as to make it convenient for the cashier to descend into the pit.

Figure 5:
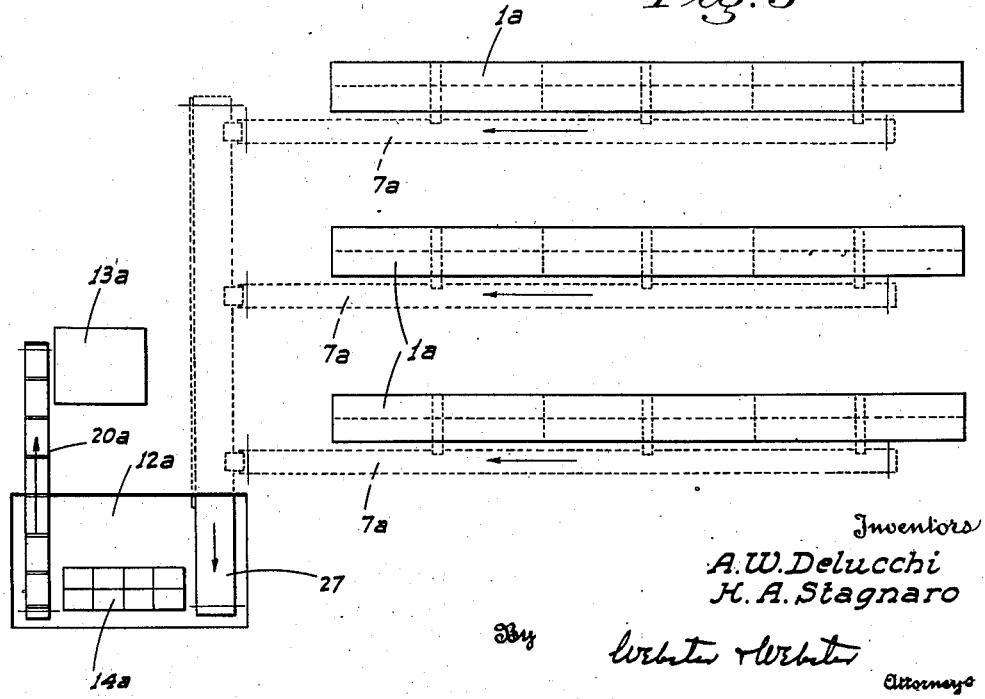
Figure 5 is a diagrammatic plan view of the conveyor system employed in a store having multiple rows of shelves.

In Fig. 5 the system is substantially as above described, except that it is shown as embodied in a store which includes a plurality of rows of shelves, shown at 1a. In this embodiment there is a separate under-floor conveyor 7a for each row of shelves, and such conveyors deliver to a common cross conveyor 27, which in turn extends to the sorting station in a pit 12a. The rack for the merchandise containers and price computing machines is shown at 14a, and the checking station to the cashier's counter conveyor is shown at 20a, while the cashier's counter is indicated at 13a.

From the foregoing description it will be readily seen that we have produced such a system as substantially fulfills the objects of the invention as set forth herein.

While this specification sets forth in detail the present and preferred construction of the system, still in practice such deviations from such detail may be resorted to as do not form a departure from the spirit of the invention, as defined by the appended claims.

Having thus described our invention, what we claim as new and useful and desire to secure by Letters Patent is:

1. A merchandise conveying system for a store which includes a row of shelves and a receiving counter disposed some distance from said row; said system comprising a power driven conveyor extending beneath the floor of the store from adjacent the row to a mainly below floor sorting station, a chute leading from a point above the floor adjacent said row to a point of discharge below the floor onto said conveyor, said chute being adapted to receive articles selected and marked by the customer, and an elevating conveyor operative to move merchandise from said sorting station to a point adjacent the counter.

2. A merchandise conveying system for a store which includes a row of shelves and a receiving counter disposed some distance from said row; said system comprising a sorting station, an under-floor conveyor leading from adjacent said row to said station, a chute leading from a point above the floor adjacent said row to a point of discharge below the floor onto the conveyor, said chute being adapted to receive articles selected and marked by the customer, and means to convey sorted merchandise from said station to adjacent the counter; said sorting station being disposed in a pit adjacent the counter.

3. A merchandise conveying system for a store which includes a row of shelves and a receiving counter disposed some distance from said row; said system comprising a power driven conveyor extending beneath the floor of the store from adjacent the row to adjacent the counter, and a chute leading from a point above the floor adjacent said row to a point of discharge below the floor onto said conveyor, said chute being adapted to receive articles selected and marked by the customer; the row of shelves being open on opposite sides and said chute being branched intermediate its ends with the branches opening from the row on opposite sides thereof.

ANTHONY W. DELUCCHI.
HENRY A. STAGNARO.